United States Patent
Cobble

(10) Patent No.: US 6,772,654 B1
(45) Date of Patent: Aug. 10, 2004

(54) CORIOLIS CRANKSHAFT

(76) Inventor: Daniel L. Cobble, 3401 Lesway Ct., Ste. 12, Louisville, KY (US) 40220

(*) Notice: Subject to any disclaimer, the term of this patent is extended or adjusted under 35 U.S.C. 154(b) by 0 days.

(21) Appl. No.: 09/637,147

(22) Filed: Aug. 14, 2000

(51) Int. Cl.$^7$ ................................................ F16C 3/04
(52) U.S. Cl. ................... 74/595; 74/603; 123/192.2; 123/192.1; 123/197.4
(58) Field of Search .................... 74/595, 596, 597, 74/598, 603, 604, 605; 123/192.1, 192.2, 197.4

(56) References Cited

U.S. PATENT DOCUMENTS

| | | | | |
|---|---|---|---|---|
| 1,165,861 A | * | 12/1915 | Fekete | 74/603 |
| 1,255,409 A | * | 2/1918 | Gordon | 74/603 |
| 1,649,541 A | * | 11/1927 | Oldson | 74/603 |
| 2,419,274 A | * | 4/1947 | McDowall et al. | 74/603 |
| 2,477,376 A | * | 7/1949 | Jacobsen | 123/197.4 |
| 3,748,925 A | * | 7/1973 | Stewart | 74/603 |

* cited by examiner

Primary Examiner—David A. Bucci
Assistant Examiner—Vicky A. Johnson
(74) Attorney, Agent, or Firm—Stites and Harbison, PLLC

(57) ABSTRACT

A crankshaft being integrated with stemmed, inertia-forced lobes that increase engine and motor efficiency, in which a respective lobe extends and branches out to a single traversal side of crankshaft integration, and thus being right-angular to its integration. Essentially, the lobe is a structurally-curved limb having respective curvature about the traversal axis of crankshaft rotation. Hence, the ensuing inertia from the lobes actually rotate. in the same direction and in parallel with the crankshaft, and thus retaining at least 99% of lobe force, to significantly increase engine and motor output power. By contrast, conventional lobes retain only 50% of inertial force. Furthermore, if the lobes' outer extended, weighted portions are "loaded" with very heavy material, such as lead, then the power output becomes proportionally greater. A description with illustrations of a simple experiment demonstrates the "Coriolis effect" to affirm the extraordinary operation of this crankshaft.

8 Claims, 8 Drawing Sheets

CORIOLIS CRANKSHAFT

FIELD OF THE INVENTION

The present invention relates to engines, compressors and other apparatus that manipulate the transmission of mechanical forces; and most specifically, those force-transmitting assemblies relating to the function of crankshafts.

With regards to the general nature of crankshafts, there are those crankshafts with inertia-generating lobes and those without such lobes. The present invention is concerned with a fundamental revolutionary design of lobes for those crankshafts with lobes, as well as appropriately for those traditionally non-lobe crankshafts that will accommodate this new design.

BACKGROUND OF THE INVENTION

With today's intense concern over air-pollution and its causation of global warming, there is respectively pressing demand to reduce energy consumption in engines and other force transmitting apparatus. For example, the combustion engine continues to operate at relatively low efficiency, as any further notable increase in efficiency may arrest some of our environmental worries. Wherefore, if further consideration could be given as to how to continue to manipulate the dynamics of force-transmission, then perhaps newly discovered/developed kinetic forces can arise to harness higher efficiency.

It is this purview of consideration that has manifested the present invention, otherwise known as the Coriolis Crankshaft. Hence, the term, "Coriolis," represent a focused model of the earth's "Coriolis force." As, this force is a result of the earth's continuous kinetic forces that keep air masses bent toward the earth and moving in the same relative direction, therewith.

However, it is understood that such air-mass governance is the mere end-result of the earth's gravitational force. For, the earth's land and water masses are the primary kinetic energy sources that gives rise to gravity, as again, being the root cause of the Coriolis force.—Earth's center axis, which revolves a far less distance than, for example, its furthest outer mass (at the equator) to complete a rotation, respectively rotates at significantly lower velocity than such outer mass. Therefore, gravity is the force generated by this higher velocity that the outer masses must maintain to travel/rotate and keep pace with its axis points. Since the outer mass obviously moves in the same direction as the axis point, the resulting gravitational pull, therefrom, must follow, and ensuing its bent toward the earth. Respectively, the gravitational pull is always lagging at a traversal right angle to any given point around the axis, since it is "forever trying to catch up" with that point.

This explains why the denser air masses are confined to moving across the earth's surface and provide for directional trade winds, and thus, the "Coriolis effect."

To this end, the kinetic relationship between earth's rotating forces is consistent with Albert Einstein's Theory of Relativity, whereas the higher velocity of the outer mass and lower velocity of the axis are distinctly different realities within the same movement of a body; the outer mass exhibiting "positional authority" over the other.

Accordingly, the design elements of the Coriolis crankshaft effectively simulate the Coriolis force so that at least 99% of the crankshaft's inertial load moves in the same direction and being in parallel with crankshaft rotation, itself, to render significantly higher engine/apparatus apparent output power. This, of course, is remarkable, as, by contrast, conventional crankshaft lobes yield only 50% output of their generated inertial load because the inertia moves perpendicular to the rotating direction of the crankshaft. Therefore, the Coriolis design is much superior.

For further clarification, the Summary Of The Invention includes a description with illustrations of a simple experiment that demonstrate the Coriolis force, which affirm factually sound scientific law.

Even so, to boost efficiency further, the present invention may employ another fundamental "manipulation" of force dynamics. If we reduce the weight between the crankshaft's rotating axis and its lobes' outer structures, i.e., the respective sections of the lobes that do not contribute to forward rotating inertia, then rotation resistance is further reduced, for even greater apparent output force. Such sections stem directly from integration with the crankshaft, thus not being effectively right-angular, thereof, such as the remaining respective outer structures of the lobes.

As a matter of course, placement of such sections is synonymous with conventional crankshafts, as a respective illustration shows. Consequently, should these sections be weighted, then their resulting inertial load, again, would "pull" perpendicular to the rotating direction of the Coriolis crankshaft and counter-acts the inertia that rotates in the same/parallel direction, thereof.

Therefore, the Coriolis crankshaft represents a fundamental redesign of the conventional crankshaft. Appropriately, the complex relationship between the kinetic angles-of-attack of the various motion elements and crankshaft components is re-examined.

Hence, what is sought is a crankshaft that can help to render higher apparent output power, so that notably less fuel consumption is required for outputs of contemporary standards, such as in engines. This is in lieu of the fact that contemporary crankshafts have not undergone significant improvement for many years. Ergo, a revolutionary design, such as the Coriolis crankshaft, may well provide the impetus needed to spurn other important kinetic-based developments.

SUMMARY OF THE INVENTION

The Coriolis crankshaft, as aforementioned, is the present invention, and comprises a crankshaft with placement of journals for interfacing bearings and other force-transmitting apparatus, such as the connecting-rod assembly, and a lobe design in which the lobe-weight (at least the heavier part, thereof) branch from crankshaft integration to a single traversal side of such integration. Thus, such heavier part of the lobes are therefore respectively right-angular to such integration. These lobes are called "Coriolis lobes," as ideally, their construct also continually extend and are right-angular to crankshaft integration, and upon extending from the integrated area, they broaden in size and weight so as to develop stronger rotational inertia during crankshaft operation.

Even more specifically, the Coriolis lobes are unrestrained, structured limbs that form curvatures about the traversal axis of crankshaft rotation. This circular shape, being similar to the outer shape of the conventional lobe design, is necessary if the Coriolis effect is to be fully achieved.

The purpose of this design is so that the rotational inertia developed by the Coriolis lobes move/rotate in the same direction and in parallel with the rotating crankshaft, in which the crankshaft aggregates at least 99% of the lobes' inertial force.

Furthermore, the Coriolis lobes may be balanced and weighted in accordance with their forward momentum and respective rotation with the crankshaft, so as to achieve proper operation, thereof. This "right-angular balancing" will provide for improved balancing, less bearing-wear, and overall reduced rotation resistance because, again, the inertial load moves in parallel with the crankshaft.

Another important feature of the present invention is that a Coriolis lobe may be composed of two distinct materials, and thus being a multi-piece lobe. A very heavy material, such as lead, may comprise the portion of the lobe that is right-angular. This heavy portion is called the "loaded portion" because the heavier such portion then the stronger the inertial force that will be induced. And conversely, the other portion, which is called the "benign portion," integrates directly with the crankshaft and not necessarily being effectively right-angular, thereof, and may be composed of a much lighter-weight material, such as a polymer composite. The benign portion, by nature of its relative placement, is non-effectual in producing forward inertial force, and therefore, reducing its weight respectively reduces crankshaft rotational resistance, and thus also providing greater output power.

Although the Coriolis lobe may comprise a stemmed single piece that is equivalent to the combined length of the loaded and benign portions, as previously alluded to, the multi-piece design strategically utilizes the kinetic-based motions and material-mass variables that are inherently available for improving such design. To this end, manufacturers and marketers have the opportunity to significantly address the global warming problem that results in higher fuel efficiency for end-items.

To affirm the effective function of the present invention, FIGS. 3 & 4 depict a simple experiment for inducing the Coriolis effect, that is easy to perform.

In FIG. 3, the man 31, as shown from overhead, is holding a heavy telephone book 32. The telephone book simulates the loaded portion of a Coriolis lobe, and its flexibility is acted upon by the Coriolis effect that ensues. Please note center-point line 33 that traverses his head and arm; the telephone book is right-angular, as depicted by arrow 34, to the man's head; his head being the traversal axis to simulate crankshaft rotation. His left shoulder 35 simulates integration of the benign portion of the Coriolis lobe. Also, please note that his arm, in conjunction with the extended telephone book, has the essential perimeter shape of the traditional crankshaft lobe. Again, this limbed, curved shape is necessary to maximize the Coriolis effect.

Accordingly, in FIG. 4, as the man spins clockwise by way of arrow 41, the pages of the telephone book immediately flex in the same direction that he is turning, as shown by directional arrow 42, thus being effected by the Coriolis force.

Furthermore, the collective, directional flexing of all pages 43 in the telephone book affirms that at least 99% (as probably 100%) of the inertial force travels in the same direction that the man is spinning, to simulate the Coriolis crankshaft. As the man spins faster the telephone book feels lighter because the higher velocity respectively aggregates stronger inertial forces.

Not the least, it is this highly significant aggregation of force that further reduces crankshaft rotating resistance to a compression-load source from, for example, the piston cylinders of an engine. Thereby, less compression and respectively less fuel is needed for comparable apparent output power.

Ergo, this demonstrated measurement of at least 99% output does not consider the proven aggregation of inertia as generated by the Coriolis lobes. Only the testing of a Coriolis crankshaft can provide measurements of actual aggregated output, which are likely to significantly exceed 99% due to much higher rotation speeds.

So, conclusively, although the Coriolis crankshaft retain many features of the conventional crankshaft, the revolutionary right-angular lobe configuration makes an important difference for the benefit of end-item output.

LIST OF ILLUSTRATIONS

DETAILED DESCRIPTION OF THE PREFERRED EMBODIMENTS

Figure 1:
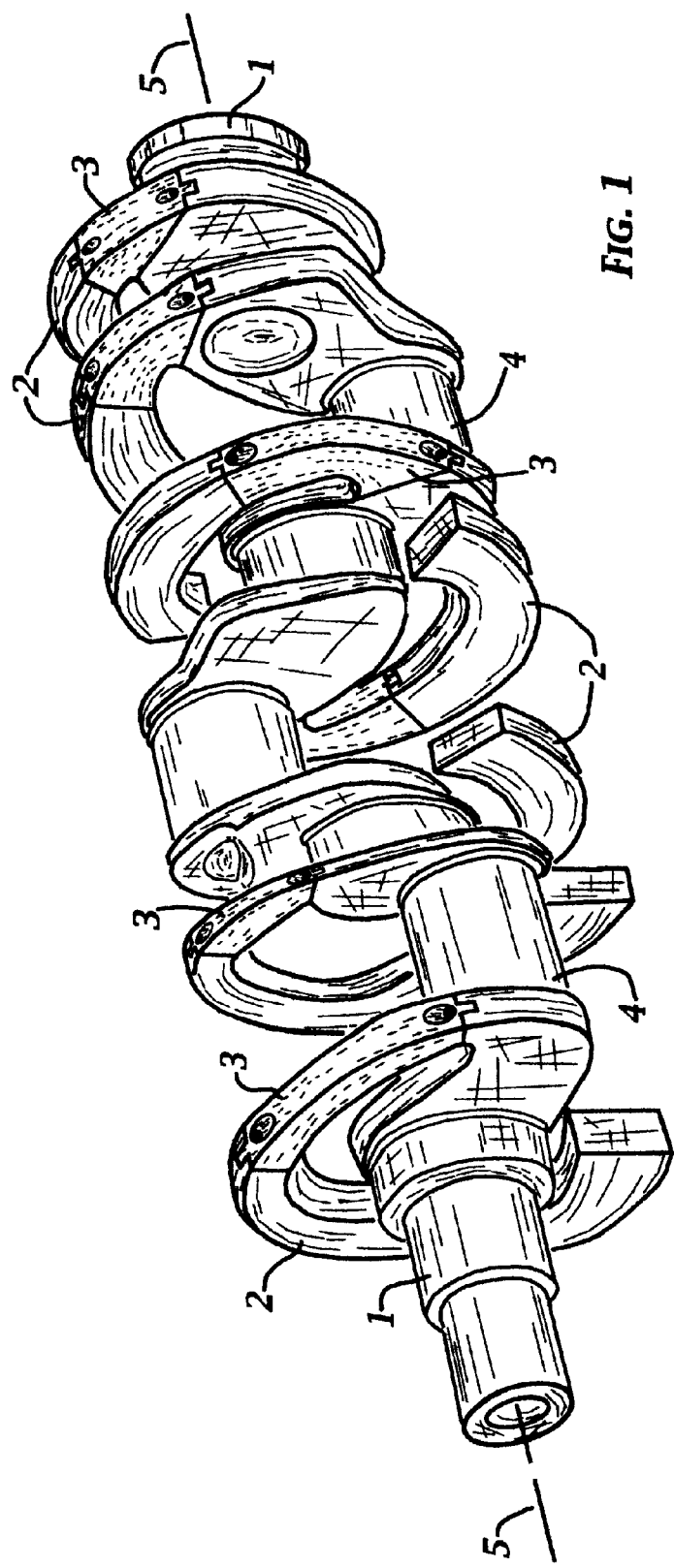
FIG. 1 is a composite view of the Coriolis crankshaft.

FIG. 1 shows a composite view of the Coriolis crankshaft 1 with typical placement of appropriate journals and respective Coriolis lobes. Three of the five journals shown are selected by journal 4 (the sixth journal is obscured by adjacent components). The seven Coriolis lobes shown are comprised by loaded portions 2 and benign portions 3, as a loaded portion and benign portion comprises the Coriolis lobe as an ideal composition. A loaded portion may be composed of a material such as lead, and the benign portion may be composed of a polymer composite. Lateral axis lines 5, at the front and rear, depict the center rotating axis of the Coriolis crankshaft. As shown, the lobes branch away from the crankshaft and freely and continually branch into respective traversal curvatures about the crankshaft's axis of rotation and become right angular to their respective integrations with the crankshaft.

Figure 2:
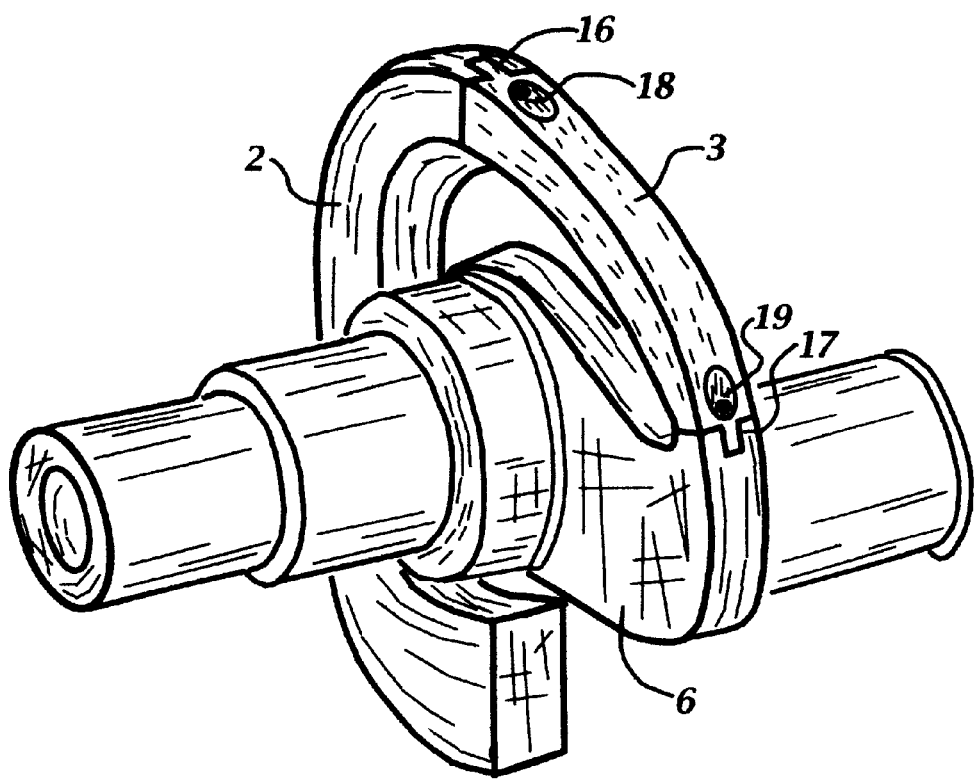
FIG. 2 is a closeup sectional view showing a single Coriolis lobe as taken from the Coriolis crankshaft.
Figure 3:
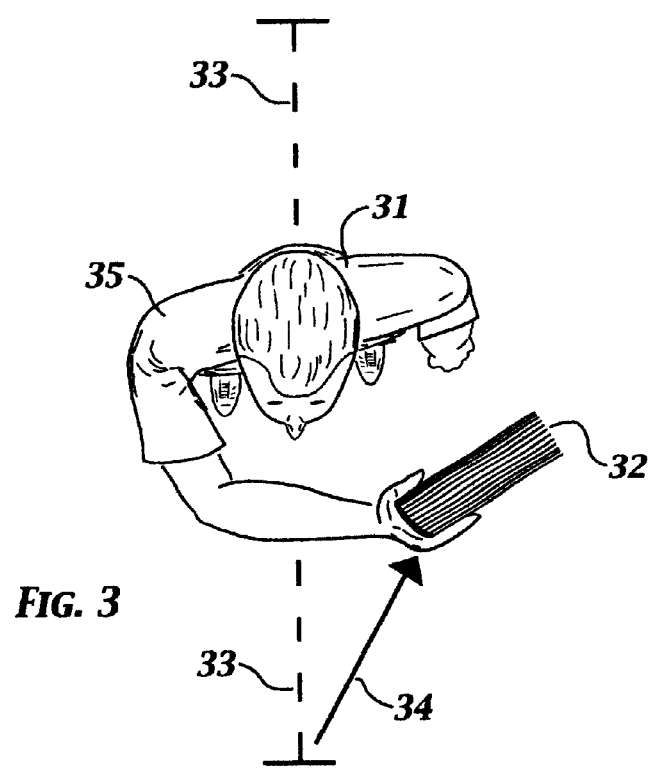
FIG. 3 shows an overhead view of a man beginning the Coriolis force experiment.
Figure 4:
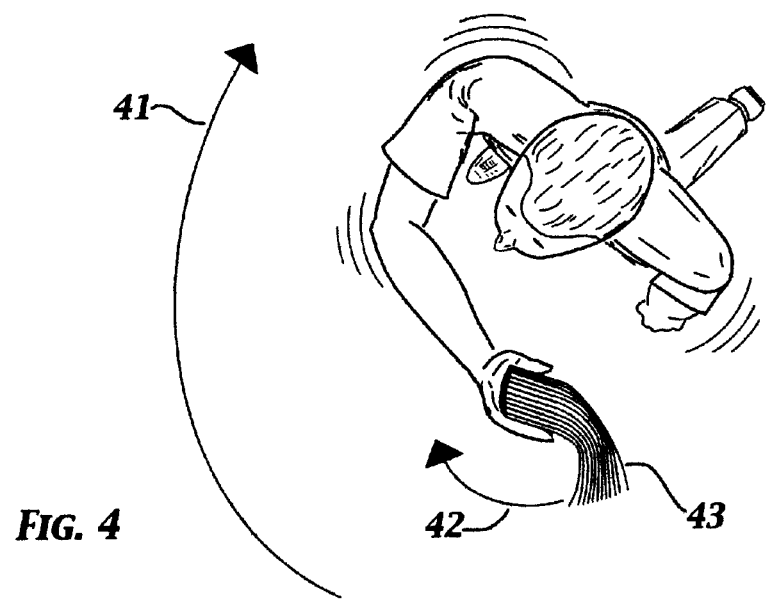
FIG. 4 shows an overhead view of a man performing the Coriolis force experiment.

FIG. 2 shows a close-up section 6 of the Coriolis crankshaft of FIG. 1. Loaded portion 2 and benign portion 3, as again, comprises the Coriolis lobe, are interfaced by mating slot means 16 and securely adjoined together by inset screw 18. At the other end of the benign portion, the benign portion integrates with section 6 by mating slot means 17 and adjoined together with section 6 by inset screw 19. Mating slot means 16 & 17 and securement means of inset screws 18 & 19 exemplify integration of all other Coriolis lobes with the Coriolis crankshaft of FIG. 1.

Figure 5:
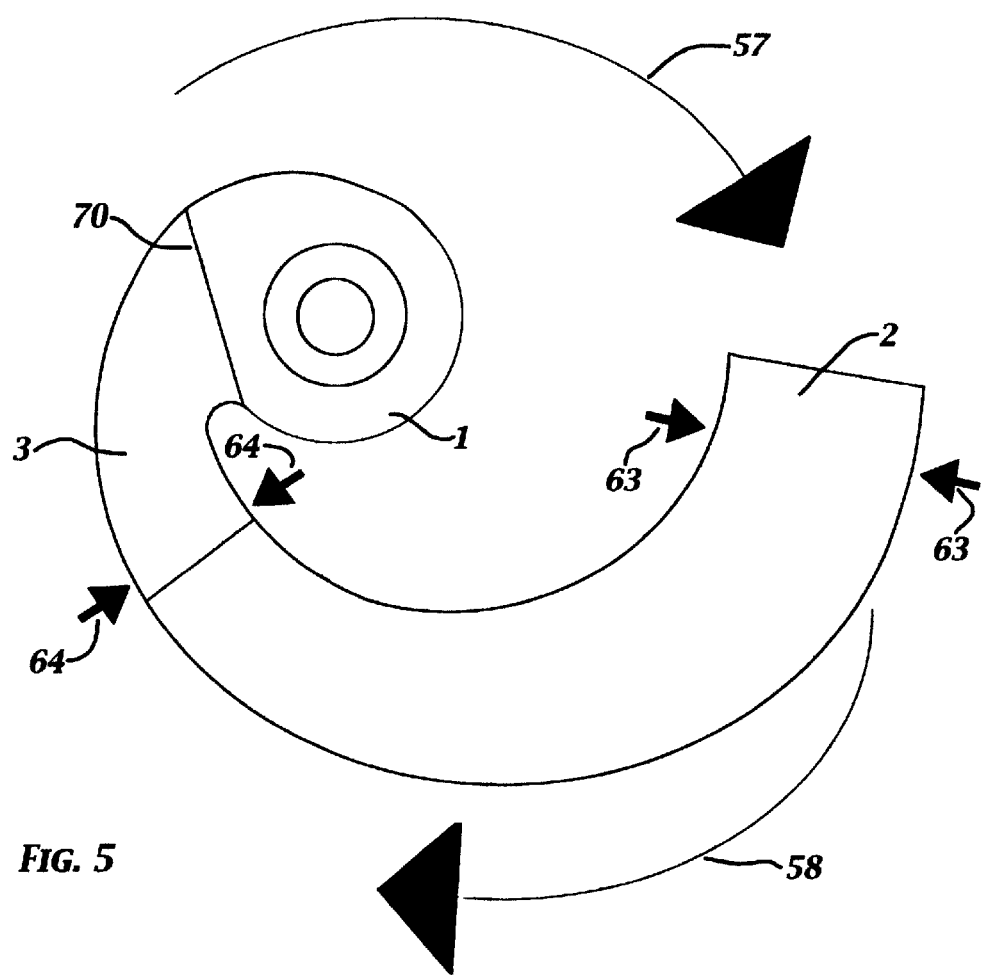
FIG. 5 is a simplified traversal view of the Coriolis lobe's inertial path in reference to crankshaft rotation.

FIG. 5 is a simplified traversal view of a Coriolis lobe's inertia path in reference to crankshaft rotation. Item 1 respectively depicts crankshaft 1 of FIG. 1. Consequently, during crankshaft operation while rotating in the clockwise direction as depicted by arrow 57, arrow 58 depicts respective clockwise following of the inertial force/load that is generated mostly from the Coriolis lobe's loaded portion 2. Dimension arrows 63 in regards to the differing narrower width of dimension arrows 64 depict the widening and material-mass increase/loading of the Coriolis lobe. The Coriolis lobe continually stems away from integrated line 70 that depicts integration of benign portion 3 and the crankshaft, and the Coriolis lobe continues its curvature about said crankshaft with continuation to loaded portion 3.

Figure 6:
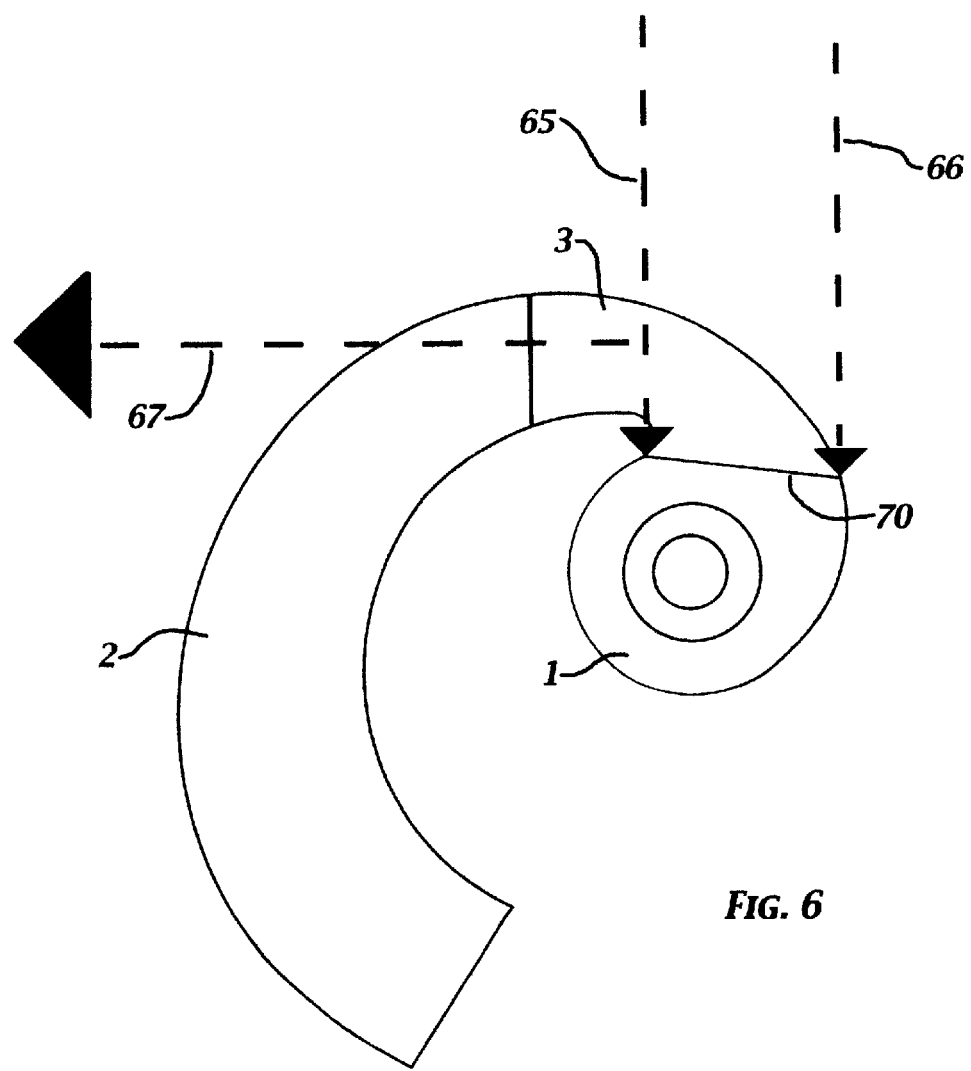
FIG. 6 is a simplified traversal view of a Coriolis lobe showing the fundamental characteristics, thereof.

In FIG. 6 the same items are shown as in FIG. 5, except that hidden-line parallel arrows 65 & 66 show the basic alignment relationship between a part of benign portion 3 and said crankshaft 1. The integrated part of benign portion 3 (again, as depicted by said line 70) and its alignment with said crankshaft 1 are within the area that is between said arrows 65 & 66. The remainder of the Coriolis lobe, which includes the other part of said portion 3 that is outside of said area and loaded portion 2, branch out and being right-angular to integration of the Coriolis lobe, as depicted by right-angular arrow 67.

Figure 7:
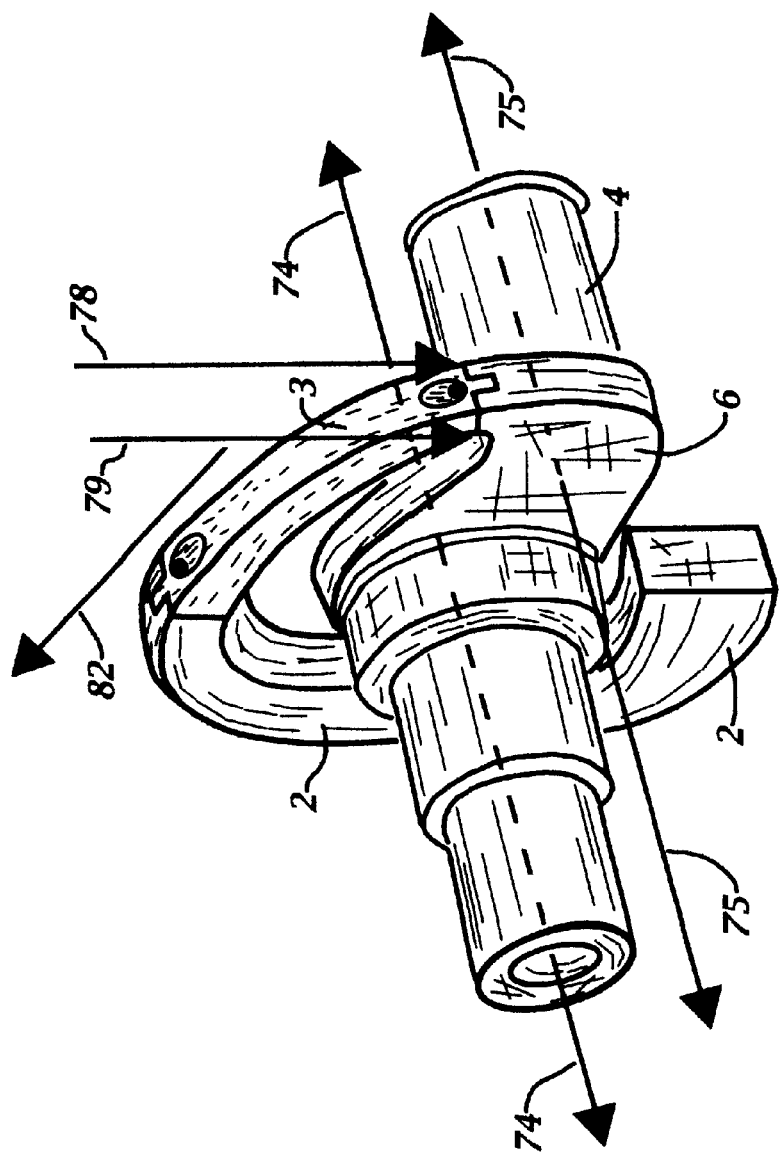
FIG. 7 shows how the abstract description of the elements in FIG. 6 are applied comprehensively to the configured Coriolis lobe.

For further clarification, in FIG. 7 the abstract description of the elements in FIG. 6 are applied comprehensively to the configured Coriolis lobe of section 6, of again, the Coriolis crankshaft 1 of FIG. 1. Axis linear row 74 depicts the rotating axis of section 6, and center-line arrow 75 depicts the traversal center-point of journal 4. The area of benign portion 3 that is between parallel arrows 79 & 78 is the integrated area of said portion 3 and section 6. Right-angular arrow 82 depicts the right angular branching of the remaining part of said portion 3 and loaded portion 2, and therefore, the portion of the Coriolis lobe that is outside said integrated area, stems to a single traversal side of crankshaft integration, and being right-angular.

Figure 8:
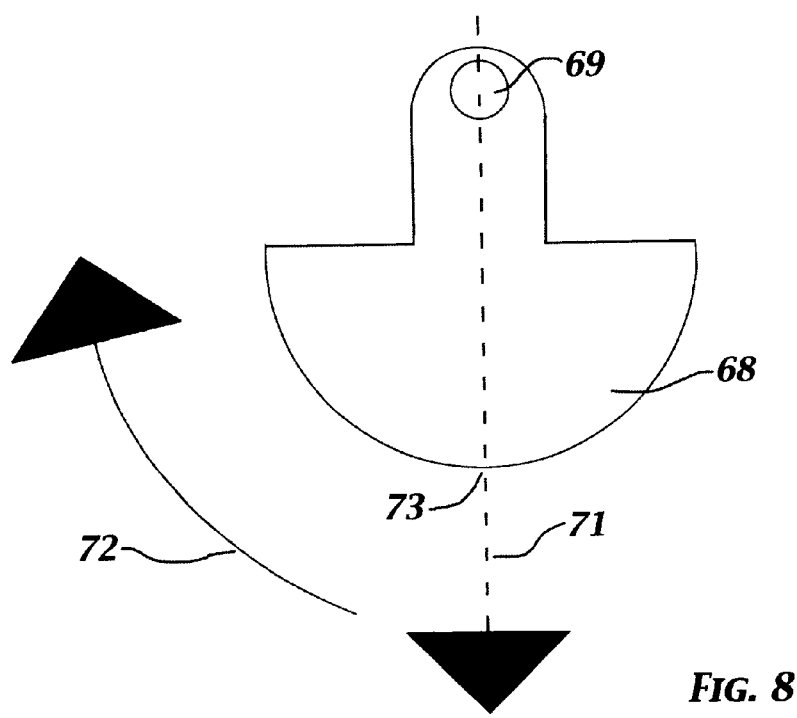
FIG. 8 is a simplified view of the outlined shape of the conventional lobe and the inertial force characteristics, thereof.

FIG. 8 shows a simplified outline configuration of a conventional crankshaft lobe 68. Axis point 69 depicts the rotating axis of said lobe 68. And, hidden-line arrow 71 depicts the substantial weight of said lobe 68 being balanced on either side of said arrow 71 and in alignment with said axis point, as said arrow 71 crosses the centered bottomside apex 73 of said lobe 68. Also, said arrow 71 depicts the direction of the inertial force as generated by said lobe 68. Respectively, directional arrow 72 depicts said lobe 68 rotating clockwise. Hence, the relationship between said arrow 71 and said arrow 72 demonstrate that the inertial force generated by said lobe 68 moves perpendicular to direction of which said lobe 68 rotates, and therefore, perpendicular to the direction of the would-be rotating crankshaft of said lobe 68. Therefore, the conventional lobe can only output 50% of the inertia generated.

Figure 9:
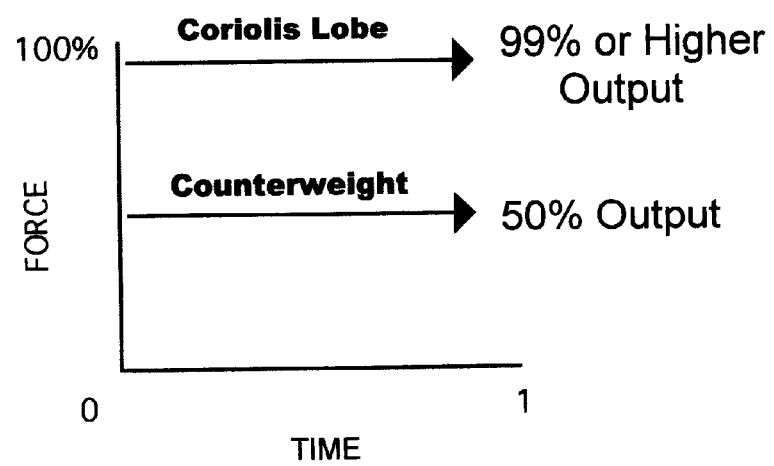
FIG. 9 is a simplified graph displaying the output power difference between the Coriolis lobe and the conventional crankshaft lobe.

FIG. 9 shows a simplified graph of the inertial force output difference between a Coriolis lobe and conventional lobe. Immediately from time-zero, both lobes will rise to their maximum inertial force outputs, in accordance with crankshaft-rotating speeds. The conventional lobe will only reach 50% of inertial load output, because, as aforementioned, the inertial force is directionally perpendicular to the rotating direction of its crankshaft. However, since inertia of the Coriolis lobe moves in the same direction as the Coriolis crankshaft rotation, the Coriolis lobe's inertial load output will be at least 99% or higher.

Figure 10:
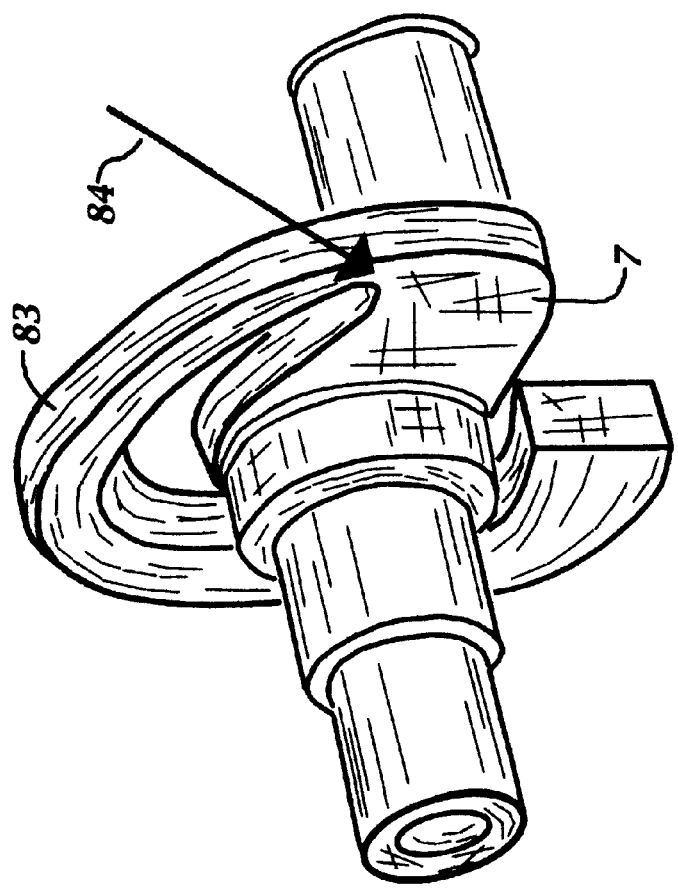
FIG. 10 shows the Coriolis lobe as a single-piece construct.

FIG. 10 shows a view of section 7 of a Coriolis crankshaft that shows stemmed Coriolis lobe 83 as a single-piece lobe. Arrow 84 points to the area of integration of section 7 and said lobe 83; there is no distinct connecting point, as said lobe 83 begins at the point of extending away from section 7. As with the multi-piece Coriolis lobe, most of the inherent characteristics of the single-piece lobe are the same; the benign portion of a multi-piece lobe is not necessary for proper crankshaft operation.

What I claim is:

1. A crankshaft having a Coriolis lobe that utilizes the right angular greater mass of said lobe to generate inertia that moves with directional rotation of said crankshaft; said greater mass branching from integration with said crankshaft as a curved protrusion around the crankshaft's rotating axis;

said lobe having a first side comprising the outer curved perimeter of said lobe and a second side comprising the inner curved perimeter of said lobe in relations to said rotataing axis; and thus said first side and said second side respectively establishing an outermost side and an innermost side of said integration;

the greater portion of the mass of said lobe being right angular to the innermost side of said integration, as said greater portion comprising respectively the greater protions of said first side and said second side that protrudes into curvature around said rotating axis of said crankshaft to a predetermined length that induces an inertial load within directional rotation of said crankshaft during operation, and thus producing the Coriolis effect upon the crankshaft.

2. The crankshaft of claim 1 including further: said lobe protruding from said integration to widen along said curvature.

3. The crankshaft of claim 1 including further: said lobe comprising multiple portions and thus providing at least a first and second portion; and said second portion being heavier than said first portion.

4. The crankshaft of claim 1 including further: said crankshaft having multiple lobes being the same as said lobe.

5. A shaft having a Coriolis lobe that utilizes the right angular greater mass of said lobe to generate inertia that moves with directional rotation of said shaft; said greater mass branching from integration with said shaft as a curved protrusion around the shaft's rotating axis;

said lobe having a first side comprising the outer curved perimeter of said lobe and a second side comprising the inner curved perimeter of said lobe in relations to said rotataing axis; and thus said first side and said second side respectively establishing an outermost side and an innermost side of said integration;

the greater portion of the mass of said lobe being right angular to the innermost side of said integration, as said greater portion comprising respectively the greater protions of said first side and said second side that protrudes into curvature around said rotating axis of said shaft to a predetermined length that induces an inertial load within directional rotation of said shaft during operation, and thus producing the Coriolis effect upon the shaft.

6. The shaft of claim 5 including further: said lobe protruding from said integration to widen along said curvature.

7. The shaft of claim 5 including further: said lobe comprising multiple portions and thus providing at least a first portion and a second portion; and said second portion being heavier than said first portion.

8. The shaft of claim 5 including further: said shaft having multiple lobes being the same as said lobe.

* * * * *